United States Patent [19]

Hsia Chen

[11] Patent Number: 4,520,221

[45] Date of Patent: May 28, 1985

[54] PROCESS OF MAKING HIGH VI LUBES

[75] Inventor: Catherine S. Hsia Chen, Berkeley Heights, N.J.

[73] Assignee: Mobil Oil Corporation, New York, N.Y.

[21] Appl. No.: 598,139

[22] Filed: Apr. 9, 1984

[51] Int. Cl.³ .............................................. C07C 2/02
[52] U.S. Cl. .................................... 585/517; 585/533
[58] Field of Search ................................. 585/517, 533

[56] References Cited

U.S. PATENT DOCUMENTS

| | | | |
|---|---|---|---|
| 4,029,719 | 6/1977 | Forni et al. | 585/533 |
| 4,211,640 | 7/1980 | Garwood et al. | 208/255 |
| 4,417,086 | 11/1983 | Miller | 585/517 |
| 4,453,029 | 6/1984 | Dessau | 585/828 |

*Primary Examiner*—Curtis R. Davis
*Attorney, Agent, or Firm*—A. J. McKillop; M. G. Gilman; L. G. Wise

[57] ABSTRACT

High VI lubes in high yields are obtained when lower or light olefins are polymerized over a ZSM-5 type catalyst the surface acidity of which has been inactivated by treatment with a suitable base material.

12 Claims, No Drawings

PROCESS OF MAKING HIGH VI LUBES

BACKGROUND OF THE INVENTION

This invention is directed to a process which provides high lube yields with substantially higher VI's than previously achieveable from inexpensive lower or light olefins such as propylene. More particularly, this invention is directed to a process wherein high VI lube oils are made from propylene containing feeds using ZSM-5 type catalysts wherein the surface activity of the catalyst has been modified by reducing or substantially eliminating the surface acidity.

The conversion of olefins over ZSM-5 type zeolites is known in the art and is the subject of many patents. For example, U.S. Pat. No. 4,227,992 and the patents mentioned therein are excellent examples of the prior art in connection with this general subject.

U.S. Pat. No. 4,126,644 discloses conversion of a $C_5$-400° F. liquid fraction, from a Fischer Tropsch synthesis, prodominately $C_5$-$C_{10}$ olefins over zeolite ZSM-5 in order to produce higher boiling products including a 650° F.+ lube fraction.

U.S. Pat. No. 4,101,595, in a process for conversion of ethyl benzene to p-xylene discloses a dual functional zeolitic catalyst in which preferably the acid function activity is reduced, for example, by either pretreatment of the catalyst or by co-feed of an agent which impairs the acid function, e.g., ammonia, an amine, or other ammonia derived compound.

U.S. Pat. No. 4,100,215 and 4,002,697 disclose in selective p-xylene production the use of suitable compounds of nitrogen or silicon, preferably an organic radical substituted silane, to modify and deactive the external surface of a crystalline aluminosilicate zeolite catalyst.

Additionally, zeolites have been modified via exchange and similar technology with large cations such as $N^+$, $P^+$ large branch compounds such as polyamines and the like, see U.S. Pat. No. 4,101,595; large phenols and via silicating agents see U.S. Pat. Nos. 4,100,215 and 4,002,697, respectively.

It has now been discovered that the viscosity index of lubes produced from olefins such as propylene over zeolitic catalysts can be greatly improved, for example, by removing its surface acidity by treating the catalyst for example, with a bulky amine such as a disubstituted pyridine, e.g., 2,6-di-tertiary-butylpyridine. Either a one stage or a two stage process utilizing this concept can be used to provide high yields from the polymerization of lower olefins by catalysis with ZSM-5 type zeolites treated as described herein.

DESCRIPTION OF PREFERRED EMBODIMENTS

The crystalline zeolites utilized herein are members of a novel class of zeolitic materials which exhibit unusual properties. Although these zeolites have unusually low alumina contents, i.e. high silica to alumina mole ratios, they are very active even when the silica to alumina mole ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts, generally have low coke-forming activity and therefore are conducive to long times on stream between regenerations by burning carbonaceous deposits with oxygen-containing gas such as air.

An important characteristic of the crystal structure of this novel class of zeolites is that it provides a selective constrained access to and egress from the intracrystalline free space by virtue of having an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with silica to alumina mole ratios of at least 12 are useful, it is preferred to use zeolites having substantially higher silica/alumina ratios, e.g. 1600 and above. In addition, zeolites as otherwise characterized herein but which are substantially free of aluminum, that is zeolites having silica to alumina mole ratios of up to infinity, are found to be useful and even preferable in some instances. Such "high silica" or "highly siliceous" zeolites are intended to be included within this description. Also included within this definition are substantially pure silica analogs of the useful zeolites described herein, that is to say those zeolites having no measurable amount of aluminum (silica to alumina mole ratio of infinity) but which otherwise embody the characteristics disclosed.

The novel class of zeolites, after activation, acquire an intracrystalline sorption capacity for normal hexane which is greater than that for water, i.e. they exhibit "hydrophobic" properties. This hydrophobic character can be used to advantage in some applications.

The novel class of zeolites useful herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although in some instances excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons and, therefore, it is not the present intention to entirely judge the usefulness of a particular zeolite solely from theoretical structural considerations.

Rather than attempt to judge from crystal structure whether or not a zeolite possesses the necessary constrained access to molecules of larger cross-section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature is adjusted between 290° C. and 510° C. to give an overall conversion of between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10 to 60% for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. and a liquid hourly space velocity of less than one, such as 0.1 or less, can be employed in order to achieve a minimum total conversion of about 10%.

The "Constraint Index" is calculated as follows:

$$\text{Constraint Index} = \frac{\log_{10}(\text{fraction of hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of 1 to 12. Constraint Index (CI) values for some typical materials are:

| Zeolite | C.I. |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| ZSM-48 | 3.4 |
| TMA Offretite | 3.7 |
| Clinoptilolite | 3.4 |
| Beta | 0.6 |
| H—Zeolon (mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables such as crystal size of the zeolite, the presence of occluded contaminants, etc., may affect the constraint index. Therefore, it will be appreciated that it may be possible to so select test conditions as to establish more than one value in the range of 1 to 12 for the Constraint Index of a particular zeolite. Such a zeolite exhibits the constrained access as herein defined and is to be regarded as having a Constraint Index in the range of 1 to 12. Also contemplated herein as having a Constraint Index in the range of 1 to 12 and therefore within the scope of the defined novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value within the range of 1 to 12. Thus, it should be understood that the Constraint Index value is used herein is an inclusive rather than an exclusive value. That is, a crystalline zeolite when identified by any combination of conditions within the testing definition set forth herein as having a Constraint Index in the range of 1 to 12 is intended to be included in the instant novel zeolite definition whether or not the same identical zeolite, when tested under other of the defined conditions, may give a Constraint Index value outside of the range of 1 to 12.

The novel class of zeolites defined herein is exemplified by ZSM-5, ZSM-11, ZSM-12, ZSM-22, ZSM-23, ZSM-35, ZSM-38, ZSM-48, ZSM-50 and other similar materials.

ZSM-5 is described in greater detail in U.S. Pat. No. 3,702,886 and U.S. Pat. No. Re. 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-22 is described in U.S. Pat. Application Ser. No. 373,451 filed Apr. 30, 1982, and now pending. The entire description thereof is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 can be identified, in terms of moles of anhydrous oxides per 100 moles of silica, as follows:

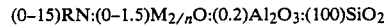

wherein:

M is at least one cation having a valence n; and
RN is a $C_1$–$C_{20}$ organic compound having at least one amine functional group of $pK_a \leq 7$.

It is recognized that, particularly when the composition contains tetrahedral framework aluminum, a fraction of the amine functional groups may be protonated. The doubly protonated form, in conventional notation, would be $(RNH)_2O$ and is equivalent in stoichiemetry to $2RN+H_2O$.

The characteristic X-ray diffraction pattern of the synthetic zeolite ZSM-48 has the following significant lines:

| Characteristic Lines of ZSM-48 | |
| --- | --- |
| d (Angstroms) | Relative Intensity |
| 11.9 | W-S |
| 10.2 | W |
| 7.2 | W |
| 5.9 | W |
| 4.2 | VS |
| 3.9 | VS |
| 3.6 | W |
| 2.85 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100\ I/I_o$, where $I_o$ is the intensity of the strongest line or peak, and d (obs.), the interplanar spacing in angstroms, corresponding to the recorded lines, were calculated. In the foregoing table the relative intensities are given in terms of the symbols W=weak, VS=very strong and W-S=weak-to-strong. Ion exchange of the sodium ion with cations reveals substantially the same pattern with some minor shift in interplanar spacing and variation in relative intensity. Other minor variations can occur depending on the silicon to aluminum ratio of the particular sample, as well as if it has been subjected to thermal treatment.

The ZSM-48 can be prepared from a reaction mixture containing a source of silica, water, RN, an alkali metal oxide (e.g. sodium) and optionally alumina. The reaction mixture should have a composition, in terms of mole ratios of oxides, falling within the following ranges:

| Reactants | Broad | Preferred |
| --- | --- | --- |
| $Al_2O_3/SiO_2 =$ | 0 to 0.02 | 0 to 0.01 |
| $Na/SiO_2 =$ | 0 to 2 | 0.1 to 1.0 |
| $RN/SiO_2 =$ | 0.01 to 2.0 | 0.05 to 1.0 |
| $OH^-/SiO_2 =$ | 0 to 0.25 | 0 to 0.1 |
| $H_2O/SiO_2 =$ | 10 to 100 | 20 to 70 |
| $H^+(added)SiO_2 =$ | 0 to 0.2 | 0 to 0.05 | wherein RN is a $C_1$–$C_{20}$ organic compound having amine functional group of $pK_a \leq 7$. The mixture is maintained at 80°–250° C. until crystals of the material are formed. $H^+$ (added) is moles acid added in excess of the moles of hydroxide added. In calculating $H^+$ (added) and OH values, the term acid ($H^+$) includes both hydronium ion, whether free or coordinated, and aluminum. Thus aluminum sulfate, for example, would be considered a mixture of aluminum oxide, sulfuric acid, and water. An amine hydrochloride would be a mixture of amine and HCl. In preparing the highly siliceous form of ZSM-48 no alumina is added. Thus, the only aluminum present occurs as an impurity in the reactants.

Preferably, crystallization is carried out under pressure in an autoclave or static bomb reactor, at 80° C. to 250° C. Thereafter, the crystals are separated from the liquid and recovered. The compsotion can be prepared utilizing materials which supply the appropriate oxide. Such compositions include sodium silicate, silica hydrosol, silica gel, silicic acid, RN, sodium hydroxide, sodium chloride, aluminum sulfate, sodium aluminate, aluminum oxide, or aluminum itself. RN is a $C_1$–$C_{20}$ organic compound containing at least one amine functional group of $pk_a \leq 7$, as defined above, and includes such compounds as $C_3$–$C_{18}$ primary, secondary, and tertiary amines, cyclic means (such as piperdine, pyrrolidine and piperazine), and polyamines such as $NH_2$—$C_nH_{2n}$—$NH_2$ wherein n is 4–12.

The original cations can be subsequently replaced, at least in part, by calcination and/or ion exchange with another cation. Thus, the original cations are exchanged into a hydrogen or hydrogen ion precursor form or a form in which the original cation has been replaced by a metal of Groups II through VIII of the Periodic Table. Thus, for example, it is contemplated to exchange the original cations with ammonium ions or with hydronium ions. Catalytically active forms of these would include, in particular, hydrogen, rare earth metals, aluminum, manganese and other metals of Groups II and VIII of the Periodic Table.

ZSM-50 is described in U.S. Pat. application Ser. No. 386,456 filed June 8, 1982 and now pending. The entire descriptions thereof are incorporated herein by reference.

It is to be understood that by incorporating by reference the foregoing patents and patent applications to describe examples of specific members of the novel class with greater particularity, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation of the identified patents and patent applications should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The specific zeolites described, when prepared in the presence of organic cations, are substantially catalytically inactive, possibly because the intra-crystalline free space is occupied by organic cations from the forming solution. They may be activated by heating in an inert atmosphere at 540° C. for one hour, for example, followed by base exchange with ammonium salts followed by calcination at 540° C. in air. The presence of organic cations in the forming solution may not be absolutely essential to the formation of this type zeolite; however, the presence of these cations does appear to favor the formation of this special class of zeolite. More generally, it is desirable to activate this type catalyst by base exchange with ammonium salts followed by calcination in air at about 540° C. for from about 15 minutes to about 24 hours.

Natural zeolites may sometimes be converted to zeolite structures of the class herein identified by various activation procedures and other treatments such as base exchange, steaming, alumina extraction and calcination, alone or in combinations. Natural minerals which may be so treated include ferrierite, brewsterite, stilbite, dachiardite, epistilbite, heulandite, and clinoptilolite. However, the preferred crystalline zeolites for utilization herein include ZSM-5, ZSM-11, ZSM-12, ZSM-22, ZSM-23, ZSM-35, ZSM-38, ZSM-48 and ZSM-50, with the acid or hydrogen form such as HZSM-5 being particularly preferred.

In a preferred aspect of this invention, the zeolites hereof are selected as those providing among other things a crystal framework density, in the dry hydrogen form, of not less than about 1.6 grams per cubic centimeter. It has been found that zeolites which satisfy all three of the discussed criteria are most desired for several reasons. When hydrocarbon products or by-products are catalytically formed, for example, such zeolites tend to maximize the production of gasoline boiling range hydrocarbon products. Therefoe, the preferred zeolites useful with respect to this invention are those having a Constraint Index as defined above of about 1 to about 12, a silica to alumina mole ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article ZEOLITE STRUCTURE by W. M. Meier. This paper, the entire contents of which are incorporated herein by reference, is included in PROCEEDINGS OF THE CONFERENCE ON MOLECULAR SIEVES, (London, April 1967) published by the Society of Chemical Industry, London, 1968.

When the crystal structure is unknown, the crystal framework density may be determined by classical pycnometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will no penetrate the intracrystalline free space.

It is possible that the unusual sustained activity and stability of this special class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention, are:

|  | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |

-continued

|  | Void Volume | Framework Density |
|---|---|---|
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used.

As is the case of many catalysts, it is desired to incorporate the zeolite with another material resistant to the temperatures and other conditions employed in organic conversion process. Such materials include active and inactive materials as well as inorganic materials such as clays, silica and/or metal oxides. Inactive materials suitably serve as diluents to control the amount of conversion in a given process so that products can be obtained economically and orderly without employing other means for controlling the rate of reaction.

Suitable lower olefins generally include $C_2$ to $C_8$ olefins with propylene and butylene or mixtures thereof being preferred. However, higher olefins $C_{12}+$ may be used but for greater cost effectivness the inexpensive lower olefins are preferable.

The viscosity index of a hydrocarbon lube oil is related to its molecular architecture. Extensive branching in a molecule usually results in a low viscosity index. While we do not wish to be held to a theory of operation, we belived that two modes of polymerization of olefins take place over zeolites such as HZSM-5. One takes place inside the channels or pores producing more linear materials. The other takes place on the surface out of pores producing highly branched material. By reducing or eliminating the surface activity (surface acidity) of such zeolites less (over-all) branched products with higher VI are obtainable. The zeolites are treated with a bulky pyridine and more particularly 2,6-di-tertiary-butylpyridine to reduce or eliminate its surface acidity. Polymerization of lower olefins over the treated catalyst thus produces lubes of substantially higher VI.

The catalysts may be treated in any convenient manner known in the art which impart to them the desired degree of surface deactivation. Treatment involves contacting the catalyst with a surface modifying agent capable of deactivating catalytic (acidic) sites located on the external surface of the zeolite. Representatives of such compounds are those bases which will modify the exterior surface of the catalyst without significantly deactivating the interior thereof. For example, ammonia and simple amines and unsubstituted pyridine are not suitable, but those amines, including aromatic amines with an effective cross section larger than about 5 Angstroms are suitable, as are substituted quinolines, heterocyclic amines and alkyl substituted pyridines such as 2,4 or 2,6-di-alkyl pyridines. Preferred are bulky pyridines such as 2,6-di-tertiary-butylpyridine.

The lower molecular weight materials (650° F.−) formed over the modified catalyst are relatively linear olefins. Therefore, it is envisioned that these olefins can be even more effectively converted to lube range materials by additional polymerization. Accordingly, lube range materials can be obtained in accordance with the present invention in a one stage or a two-stage process. Generally the first stage involves oligomerization of an inexpensive lower olefin of, e.g., propylene at about 200° C. over a surface poisoned HZSM-5, the second stage involves oligomerization of the product (or a fraction of the product) from the first stage over a second and/or different zeolite, which may be modified or unmodified as desclosed herein, at about 150° C. The temperature of the second stage is significantly lower than that of the first stage, i.e., about 50°–75° lower and preferably the catalyst is an unmodified catalyst. Both high yields and high VI are achieved by this two-stage process.

Conventional temperatures, pressures and equipment may be used in the novel process disclosed herein. Preferred temperatures may vary from about 25° to about 400° C., pressures from about atmospheric to 1500 psi and WHSV from about 0.04 to about 1.0.

The following examples will serve to illustrate the process of this invention without limiting same:

EXAMPLE 1

In this example results are given which indicate that there are at least two modes of polymerization of propylene over HZSM-5, namely, on the surface, and inside the pores or channels.

Propylene (300 c.c) was polymerized over HZSM-5 (20 gm) (prepared in any convenient manner) in a one-liter autoclave at 100° C. for 232 hrs. A white wax (1 gm) and an oil (48 gm) were formed. The white wax was identified by NMR as linear molecules consisting of 135 average carbons and containing about two methyl groups on each polymer chain. The oil contained propylene dimers, trimers, tetramers, pentamers and hexamers, all of very branched configurations. Since the two types of products, linear and branched, must have been formed by two different types of polymerization, it is reasonable to conclude that the linear product was formed inside the catalyst pores or channels, and the branched product was formed on the catalyst surface. Results show that at 100°, the surface reaction was favored (48 gm branched product against 1 gm linear product).

Examples 2 and 3 illustrate the basic principle of the present invention that when the catalyst is deactivated at the surface, high quality lube products can be made from such as propylene.

EXAMPLE 2

HZSM-5 was stirred in a 10% solution of 2,6-di-tert-butylpyridine in hexane at room temperature for two hours. The catalyst was filtered off, washed twice with hexane and dried at 120° C.

Propylene (300 cc) was oligomerized over the 2,6-di-tert-butylpyridine treated catalyst (15 gm) in a one-liter autoclave at 200° C. After 72 hours the pressure deceased from 1366 to 144 psi, 200 cc propylene were charged into the autoclave and the temperature was adjusted to 200° C. After 70.2 more hours the pessure decreased from 938 to 178 psi, a second addition of 200 cc propylene was made and the temperature was again adjusted to 200° C. After 72.8 more hours the pressure decreased from 957 to 22 psi. The reaction was terminated. 334 gm of oil (nearly water-white) were recovered. The 650° F.+ lube fraction constituted 17% of the total product. The lube had kinematic viscosities of 14.2 cs at 100° F. and 3.9 cs at 210° F., and a VI of 159. A duplicate of this propylene oligomerization at 200° C. produced a 650° F. lube oil of VI=165, indicating reproducibility.

EXAMPLE 3

Oligomerization of propylene (300 cc) over 2,6-di-tert-butylpyridine treated HZSM-5 (15 gm) was carried out at 230° C. A fraction comprising 15% 650° F.+ lube was produced after 94 hours, 21% after 191 hours, 23% after 215 hours and 24% after 239 hours. From this point on there was no increase in 650° F.+ lube fraction with reaction time. The reaction was stopped after 270 hours. A nearly water-white oil was obtained. After distilling off the low boilers, the 650° F.+ lube had kinematic viscosities of 4.7 cs at 210° F., 22.2 cs at 100° F. and a VI of 133.

Example 4 illustrates the preparation of high VI lubes from propylene in two stages. The first stage involves oligomerization of propylene over 2,6-di-tert-butylpyridine treated HZSM-5 to yield higher olefins of relatively linear structure. The second stage involves oligomerization of the higher olefins from the first stage over unmodified HZSM-5 to lube range products.

EXAMPLE 4

First Stage:
Ten grams of 2,6-di-tert-butylpyridine modified HZSM-5 and 100 cc propylene were heated to 200° C. in a 475 cc Parr bomb under inert atmosphere with stirring. After 15 hrs. the pressure decreased from 1240 to 33 psi 100 cc propylene were charged and the temperature was adjusted to 200° C. After 29.5 more hours the pressure decreased from 1150 to 260 psi, 100 cc propylene were again charged and the temperature was adjusted to 200° C. After 66.3 hours from the second propylene addition the reaction was stopped. An oil product, 167.8 gm, was obtained which contained only 2.8% 650° F.+ lube fracation.

Second Stage:
162.0 gm of the product from the first stage and 15 gm of unmodified HZSM-5 were charged to a 475 cc Parr bomb. After flushing the contents with nitrogen the mixture was heated carefully to 100° C. After staying at 100° C. for 4 days (96 hours), no significant change in the oil had taken place as indicated by GC results of samples withdrawn from the reaction mixture. The temperature was raised to 150° C. After 69 hours at 150° C., the 650° F.+ lube yield was determined to be 11.2%; after 92.7 hours, 16.7%; after 116.7 hours, 19.3%; after 140.8 hours hours, 23%, after 164.7 hours, 26.4%; afater 236.7 hours; 31%. The reaction was stopped at this point and 138 gm product were recovered. After distillation, the 650° F.+ lube has kinematic viscosities of 31.1 cs at 100° F., 5.6 cs at 210° F. and a VI of 120. The pour point ws −20° F.

Examples 5, 6, and 7 provide contrasting results between oligomerization of propylene over both unmodified and 2,6-di-tert-butylpyridine modified HZSM-5 under the same experimental conditions.

EXAMPLE 5

Propylene (300 cc) was oligomerized over unmodified HZSM-5 (15 gm) in a one-liter autoclave at 200° C. for 71 hours. A yellow oil product, 158 gm, was obtained. The 650°+ lube fraction constituted 33% of the total product. The lube has kinematic viscosities of 7.6 cs at 210° F., 57.1 cs at 100° F. and a VI of 94.

The same oligomerization was carried out for a longer time. A 650° F.+ lube yield of 42.7% was obtained in 258 hours. It had kinematic viscosities of 9.6 cs at 100° F., 95.9 cs at 210° F. and a VI of 69.

EXAMPLE 6

Propylene (200 cc) was oligomerized over unmodified HZSM-5 (5 gm) in a 475 cc Parr bomb at 230° C. for 167 hours. A red-orangy oil product, 69.2 gm, was obtained. The 650° F.+ lube fraction constituted 36.4% of the total and had kinematic viscosities of 8.0 cs at 210° F., 72.0 cs at 100° F. The VI as 68.

EXAMPLE 7

Propylene (150 cc) was oligomerized over unmodified HZSM-5 (7.5 gm) in a 475 cc Parr bomb at 150° C. A 12% yield of 650° F.+ lube fraction was obtained in 234 hours. This lube had kinematic viscosities of 6.7 cs at 210° F., 45.3 cs at 100° F., and a VI of 101.

The above examples clearly show that high quality lubes can be prepared from inexpensive olefins (even from refinery streams) such as propylene over zeolites treated in accordance with the invention. The VI's obtainable are at least about 120 and comparable with those from more expensive decene-1.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. In a process for the production of high VI lubricating oils in high yields from lower olefins comprising contacting said olefins over a ZSM-5 type catalyst at elevated temperatures and pressures and obtaining a liquid product from which said lubricating oils are separated, wherein said catalyst is treated with a bulky alkylpyridine whereby its surface activity or acidity is removed or substantially eliminated.

2. The process of claim 1 wherein the olefins are selected from $C_2$ to $C_8$ olefins.

3. The process of claim 2 wherein said olefin is propylene.

4. The process of claim 1 wherein said bulky alkylpyridine is 2,6-di-tert-butylpyridine.

5. The process of claim 1 wherein the zeolite is selected from the group consisting essentially of ZSM-5, ZSM-11, ZSM-12, ZSM-22, ZSM-23, ZSM-35, ZSM-38, ZSM-48, ZSM-50 and similar naturally occurring materials and the hydrogen forms thereof.

6. The process of claim 5 wherein the zeolite is a HZSM-5 zeolite.

7. The process of claim 1 wherein the alkylpyridine has in the alkyl moiety thereof from 1 to about 8 carbon atoms.

8. The process of claim 1 wherein said bulky pyridine has an effective cross section larger than about 5 Angstroms.

9. The process of claim 1 wherein the viscosity index of lubricant range hydrocarbons boiling above 650° F. is at least about 120.

10. A process for producing substantially linear hydrocarbons by polymerizing a lower olefin at elevated temperature and pressure which comprises
    contacting the lower olefin under polymerization conditions with a medium pore siliceous zeolite having acid cracking activity, and a constraint index of about 1 to 12; wherein said zeolite has acidic pore activity and wherein the zeolite surface is substantially inactive for acidic reactions.

11. The process of claim 10 wherein the zeolite consists essentially of aluminosilicate HZSM-5 having a silica to alumina molar ratio at least 12, the zeolite surface acidity being neutralized by a bulky amine having an effective cross section larger than 5 Angstroms.

12. The process of claim 10 wherein lubricant range hydrocarbons boiling above 650° F. have a viscosity index of at least about 120.

* * * * *

UNITED STATES PATENT AND TRADEMARK OFFICE
CERTIFICATE OF CORRECTION

PATENT NO. : 4,520,221

DATED : May 28, 1985

INVENTOR(S) : C.S.H. Chen

It is certified that error appears in the above-identified patent and that said Letters Patent is hereby corrected as shown below:

Col. 4, line 22, "is" (first occurrence) should be --as--.

Col. 7, line 25, "Therefoe" should be --Therefore--.

Col. 7, line 47, "no" should be --not--.

Col. 8, line 39, "effectivness" should be --effectiveness--.

Col. 8, line 45, "belived" should be --believe--.

Signed and Sealed this

Tenth Day of December 1985

[SEAL]

Attest:

DONALD J. QUIGG

Attesting Officer

Commissioner of Patents and Trademarks